US011367009B2

(12) United States Patent
Wawda et al.

(10) Patent No.: US 11,367,009 B2
(45) Date of Patent: Jun. 21, 2022

(54) PARSING UNLABELED COMPUTER SECURITY DATA LOGS

(71) Applicant: Chronicle LLC, Mountain View, CA (US)

(72) Inventors: Abu Wawda, Cupertino, CA (US); Shapor Naghibzadeh, San Francisco, CA (US)

(73) Assignee: Chronicle LLC, Mountain View, CA (US)

( * ) Notice: Subject to any disclaimer, the term of this patent is extended or adjusted under 35 U.S.C. 154(b) by 343 days.

(21) Appl. No.: 16/518,872

(22) Filed: Jul. 22, 2019

(65) Prior Publication Data

US 2021/0027185 A1    Jan. 28, 2021

(51) Int. Cl.
*G06N 20/00* (2019.01)
*G06F 40/205* (2020.01)
*G06N 7/00* (2006.01)
*G06N 5/04* (2006.01)

(52) U.S. Cl.
CPC ............ *G06N 7/005* (2013.01); *G06F 40/205* (2020.01); *G06N 5/04* (2013.01); *G06N 20/00* (2019.01)

(58) Field of Classification Search
CPC .......... G06N 7/005; G06N 20/00; G06N 5/04; G06F 40/205
See application file for complete search history.

(56) References Cited

U.S. PATENT DOCUMENTS

| 7,690,037 B1 * | 3/2010 | Hartmann ............... G06F 11/00 726/23 |
| 8,819,178 B2 | 8/2014 | Baum et al. |
| 9,135,560 B1 * | 9/2015 | Saurabh ................. G06N 5/022 |
| 10,158,652 B2 | 12/2018 | Muddu et al. |
| 2019/0075126 A1 | 3/2019 | Muddu et al. |

OTHER PUBLICATIONS

Du, M. et al, DeepLog: Anomaly Detection and Diagnosis from System Logs through Deep Learning, [retrieved Mar. 9, 2022]. Retrieved from Internet:<https://dl.acm.org/doi/abs/10.1145/3133956.3134015> (Year: 2017).*
Zhu, J., et al, Tools and Benchmarks for Automated Log Parsing, [retrieved Mar. 21, 2022]. Retrieved from Internet:< https://ieeexplore.ieee.org/abstract/document/8804456> (Year: 2019).*

* cited by examiner

*Primary Examiner* — Brian M Smith
*Assistant Examiner* — Bart I Rylander
(74) *Attorney, Agent, or Firm* — Fish & Richardson P.C.

(57) ABSTRACT

In some implementations, a method includes obtaining an unlabeled computer security data log and processing the unlabeled computer security data log using a machine learning model to generate a probability distribution that includes a respective probability for each of a plurality of possible log types. Each of the plurality of possible log types is associated with a corresponding parser that parses logs of the possible log type to extract structured computer security data. The method further includes selecting the possible log type having the highest probability and parsing the unlabeled computer security data log using the parser corresponding to the selected possible log type.

17 Claims, 3 Drawing Sheets

PARSING UNLABELED COMPUTER SECURITY DATA LOGS

BACKGROUND

This specification relates generally to processing computer security data. A cybersecurity intelligence platform can receive computer security data logs, or simply, data logs, that record information about events that have occurred during one or more processes executed by computing devices on a client network. The platforms can also analyze the data logs or provide data derived from the data logs as part of determining whether there is anomalous activity on the client network. For example, an event can include a request for or receipt of information sent between computing devices.

Computer security data logs can be formatted in many different ways. For example, various cybersecurity software applications may format logs differently, while even the same company may produce different software products that generate data logs having different formats. Information can be extracted from a data log using a parser and data logs that are formatted differently generally need to be parsed using different parsers.

SUMMARY

This specification describes technologies for identifying parsers that are likely to successfully extract desired information from a given data log. For example, these technologies can include a machine learning model that is trained to determine, from a set of data log types, a probability distribution over the set of data log types that likely correspond to the given data log. A data log is input to the machine learning model, and a probability distribution over the data log types is generated as output. Using a mapping from data log types to parsers corresponding to the log types, a data analysis system can select the parser having the highest likelihood of successfully extracting information from the data log. The data analysis system can then execute the selected parser on the data log.

In general, one innovative aspect of the subject matter described in this specification can be implemented in methods that include the actions of: obtaining an unlabeled computer security data log and processing the unlabeled computer security data log using a machine learning model to generate a probability distribution that includes a respective probability for each of a plurality of possible log types. Each of the plurality of possible log types is associated with a corresponding parser that parses logs of the possible log type to extract structured computer security data. The actions further include selecting the possible log type having the highest probability and parsing the unlabeled computer security data log using the parser corresponding to the selected possible log type.

Other implementations of this aspect include one or more non-transitory computer readable media storing instructions that when executed by one or more computers cause the one or more computers to perform the actions of the methods. Implementations of the methods can include one or more of the following features.

In some implementations, the actions further includes maintaining a mapping from each of a plurality of log types to a parser corresponding to the log type. One or more of the plurality of log types can include a plurality of log subtypes.

In some implementations, the actions further include determining that the parser corresponding to the selected possible log type did not successfully parse the unlabeled computer security data log and in response, parsing the unlabeled computer security data log using the parser corresponding to the possible log type having the second highest probability.

In other implementations, the actions further include determining that the parser corresponding to the possible log type having the second highest probability successfully parsed the unlabeled computer security data log. The actions also include generating training data, the training data including the unlabeled computer security data log and a label that identifies the possible log type having the second highest probability. The actions further include training the machine learning model using the training data to predict the unlabeled computer security data log is of the possible log type having the second highest probability.

Another innovative aspect of the subject matter described in this specification can be embodied in methods that include the actions of: generating training data, the training data including a plurality of training computer security data logs and, for each training computer security data log, a label that identifies a log type of the training computer security data log. The actions further include training a machine learning model to predict log types of unlabeled computer security data logs using the training data.

In some implementations, the actions include receiving labeled training data. For each training computer security data log of the labeled training data, the actions further include the operations of: determining a first log type for the training computer security data log using a corresponding label for the training computer security data log. The operations also include determining, using a mapping from each of a plurality of log types to a parser corresponding to the log type, a parser that corresponds to the first log type. The operations further include parsing the training computer security data log using the parser that corresponds to the first log type and determining that the parser successfully parsed the training computer security data log. The operations also include, in response to determining that the parser successfully parsed the training computer security data log, adding the training computer security data log and the first log type to the training data.

In some implementations, the actions further include receiving unlabeled training data. The actions can further include, for each training computer security data log of the unlabeled training data, performing the operations of parsing the training computer security data log of the unlabeled training data using parsers selected from a plurality of parsers until a particular parser successfully parses the training computer security data log of the unlabeled training data. Each parser of the plurality of parsers corresponds to a different log type. The operations can further include determining a particular log type corresponding to the particular parser and adding the training computer security data log and the particular log type to the training data.

In some implementations, the training data further includes a label that identifies a log subtype of the training computer security data log. In other implementations, a parser that successfully parses a computer security data log labeled with a first type and a first subtype also successfully parses a computer security data log labeled with the first type and a second subtype. In yet other implementations, a first log type includes a plurality of log subtypes.

A centralized server may aggregate data logs received from many other computing devices running various cybersecurity applications. The centralized server may be unable to know which application generated a particular data log or when the application was last updated. Therefore, it is not possible for the centralized server to ascertain the log type of any particular data log, without a label that identifies the log type.

Conventional systems that parse information from data logs may maintain hundreds or thousands of parsers and use a brute force method of information extraction that includes executing many different parsers on a data log without knowing which, if any, parser will successfully extract desired information. Using such a brute force approach can be computationally expensive when considering the number of parsers that a system may maintain.

Among other advantages, embodiments feature a data analysis system including a data log identification machine learning model that is able to output a probability distribution over possible data log types, allowing the data analysis system to make an informed selection of a parser for an unlabeled data log. Therefore, the data analysis system can use less computation time and resources when determining a parser to use, as compared to conventional systems that employ a brute force method of parser selection. In addition, because the machine learning model can generate a probability distribution over possible data log types, if a first highest probability data log type is incorrect, the data analysis system can use the parser corresponding to the data log type having the next highest probability. When the data analysis system successfully determines the data log type, the system can use this information to improve future predictions made by the machine learning model.

Other advantages will be evident from the description, drawings, and claims.

BRIEF DESCRIPTION OF THE DRAWINGS

Like reference symbols in the various drawings indicate like elements.

DETAILED DESCRIPTION

Figure 1:
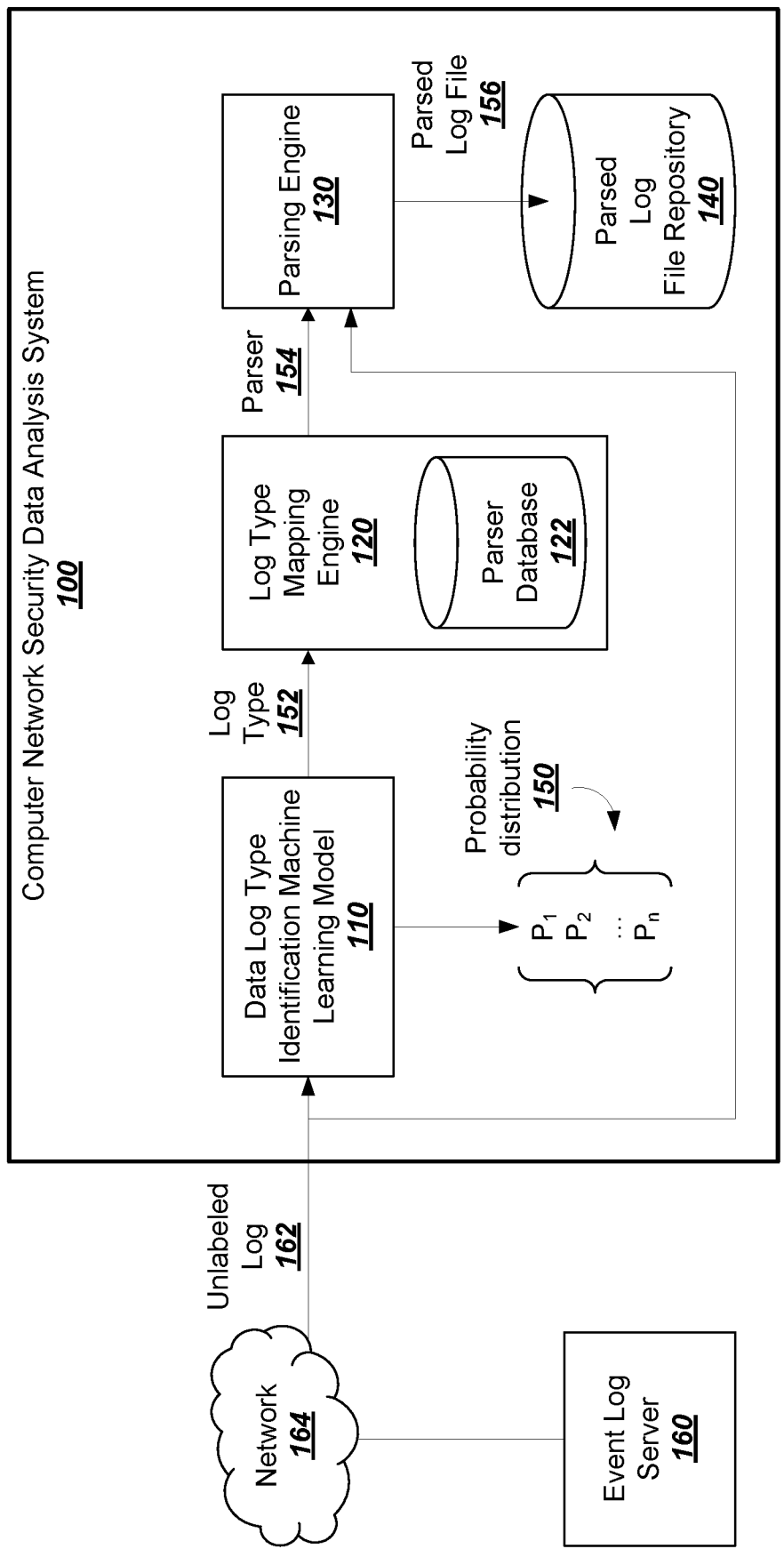
FIG. 1 is a block diagram of an example computer network security data analysis system.

FIG. 1 is a block diagram of an example computer network security data analysis system 100, or simply data analysis system 100, and an event log server 160. The event log server 160 is configured to receive information related to computer security from one or more other servers or client devices. For example, the one or more other servers or client devices can be computing devices running computer security software that generates a data log such as the unlabeled computer security data log 162, or simply unlabeled log 162. For example, the data logs can include information related to computer network activity between servers and/or client devices.

The event log server 160 can send the data analysis system 100 the unlabeled log 162. Here, "unlabeled" indicates that the data log does not include a label identifying a log type of the data log.

In contrast, a labeled log includes a label that identifies a log type of the data log. For example, all data logs generated by a particular software product, e.g., a firewall software created by a particular company, can be similarly formatted, and therefore be of the same log type. In general, data logs of the same log type are formatted similarly. For example, all data logs of a particular log type may have the same fields, e.g., source/destination host name, IP address, login timestamp. The fields included in the data logs of the particular log type can be encoded in the data log in a predictable format. For example, all data logs of a particular log type may include the same fields listed in a particular order, with each field separated by a comma or other pre-determined symbol.

Regardless of whether a data log is labeled or unlabeled with a log type, data logs contain information that a user of the data analysis system 100 may want to extract from the data log. A parser is used to extract the desired information. In general, a parser is a computer program that can take a file, e.g., a data log, as input and identify information present in the file, i.e., output specific information from the file in a standardized format. More specifically, because different log types are formatted differently, a given parser generally corresponds to a single log type and is only able to correctly parse logs of the corresponding type. The data analysis system 100 includes a parsing engine 130 that is configured to receive a parser and a data log and execute the parser using the data log as input. The parsing engine 108 can then output a parsed log file that includes desired information, and the parsed log file can be stored for analysis in a parsed log file repository 140.

Because a system that parses and analyzes data logs can include hundreds or thousands of parsers, selecting a parser that is able to successfully parse a data log can be time-consuming and computationally expensive. Determining a log type allows the system to find the correct parser for the type. Parsing a data log using an incorrect parser can result in an incorrectly parsed output or in an output indicating that the input cannot be parsed.

To facilitate the selection of a parser that will likely be successful, i.e., one that will successfully be able to parse a given data log, the data analysis system 100 includes a data log type identification machine learning model 110, or simply machine learning model 110. The data analysis system 100 trains the machine learning model 110. After the model is initially deployed, the data analysis model 100 can fine-tune the model as it receives more unlabeled data logs and log types to be trained on.

In the example of FIG. 1, the machine learning model 110 receives the unlabeled log 162 from the event log server 160 over a network 164. The machine learning model 110 is trained to output a probability distribution that includes a respective probability for each log type in a set of possible log types. The probability for each possible log type represents the likelihood that the possible log type is the correct log type for the unlabeled log 162. That is, the machine learning model returns the likelihood that the unlabeled log is of a respective log type. Each log type is associated with a parser that is able to parse the log type. The log type mapping engine 120 includes a parser database 122 for storing data associating log types with their corresponding parsers.

Of the probability distribution 150, a log type 152 has the highest probability of being the log type for the unlabeled log 162. The machine learning model 110 can output the log type 152 to a log type mapping engine 120. The log type mapping engine 120 receives the log type 152 and queries the parser database 122 to identify a parser 154, which is associated with the log type 152.

In addition to receiving the parser 154, the parsing engine 130 also receives the unlabeled log 162. The parsing engine 130 executes the parser 154 on the unlabeled log 162. Information from the unlabeled log 162 is written to a parsed log file 156 by the parsing engine 130, which outputs the parsed log file to the parsed log file repository 140.

The parsed log file 156 includes information relating to network events such as requests for data sent between client or server devices and information identifying data sent and received over a network. The data analysis system 100 can then analyze the information present in the parsed log file 156 or allow users to interact with the parsed file to identify potentially analogous behavior on the network.

Figure 2:
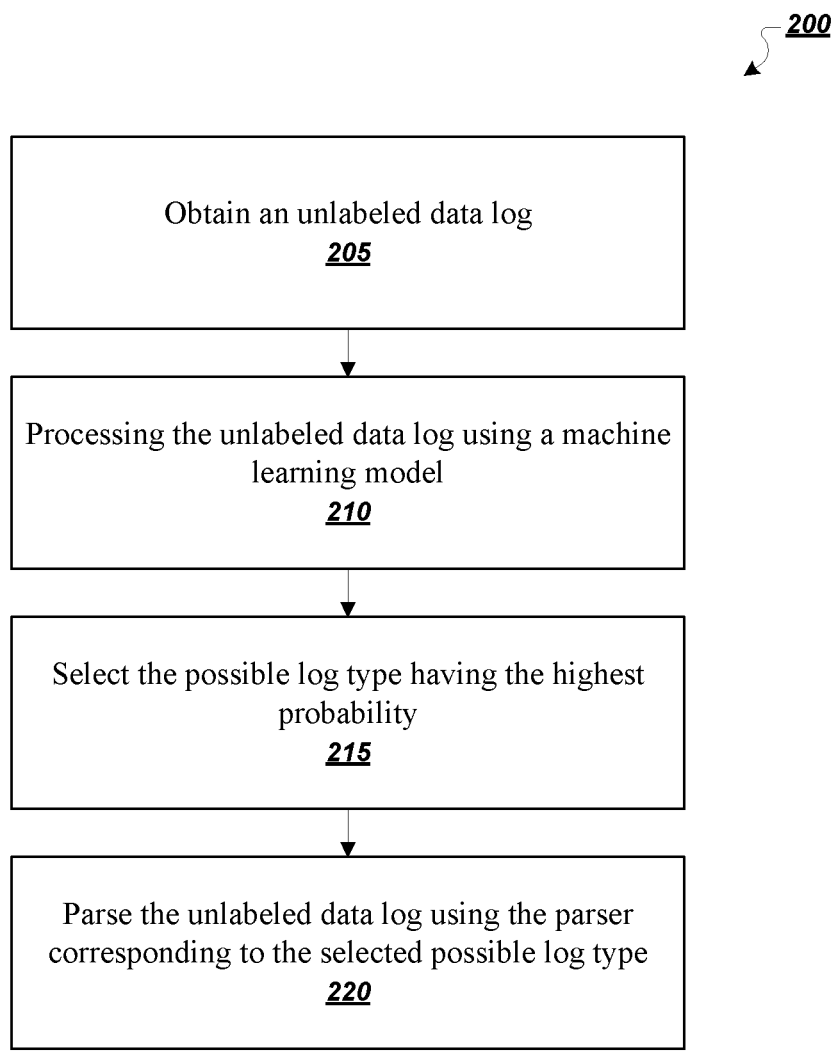
FIG. 2 is a flowchart of an example process for determining a data log type and selecting a parser corresponding to the determined data log type.

FIG. 2 is a flowchart of an example process 200 for determining a data log type and selecting a parser corresponding to the determined log type. For convenience, the process 200 will be described as being performed by a system of one or more computers, located in one or more locations, and programmed appropriately in accordance with this specification. For example, a computer network security data analysis system, e.g., the data analysis system 100 of FIG. 1, appropriately programmed, can perform the process 200.

The data analysis system obtains an unlabeled computer security data log (205). As discussed with regard to FIG. 1, the data analysis system can obtain the unlabeled data log from an event log server.

The data analysis system processes the unlabeled computer security data log using a machine learning model to generate a probability distribution that includes a respective probability for each of a plurality of possible log types, each of the plurality of possible log types being associated with a corresponding parser that parses logs of the possible log type to extract structured computer security data (210). For example, the machine learning model can process discrete units of the data log, such as characters of the data log separated by certain delimiters, e.g., commas or new line characters. As discussed with regard to FIG. 1, a machine learning model can receive the unlabeled data log and output a probability distribution over possible log types. The probability for a log type represents the likelihood that the log type is the correct log type for the unlabeled data log, i.e., that the parser corresponding to the log will be able to successfully parse the unlabeled data log.

The machine learning model can be any appropriate type of machine learning model. In some implementations, the machine learning model can be a neural network, e.g., a multi-layer perceptron or other deep feed-forward neural network. IN other implementations, the machine learning model can be a different type of machine learning model, e.g., a random forest model, a naive Bayes classifier, or a support-vector machine.

The data analysis system selects the possible log type having the highest probability (215), and parses the unlabeled computer security data log using the parser corresponding to the selected possible log type (220). The data analysis system can maintain a mapping from each of multiple log types to a parser corresponding to the log type. The data analysis system can use the mapping to select a parser corresponding to the selected possible log type. A parsing engine of the data analysis system can execute the parser on the unlabeled data log to produce a parsed log file. The data analysis system can store the parsed log file to be analyzed.

In some implementations, the data analysis system determines that the parser corresponding to the selected possible log type did not successfully parse the unlabeled data log. The parsing engine may determine that a particular parser is able to extract certain information from a data log of a corresponding log type. For example, the particular parser can include data identifying certain fields of a data log that the parser should be able to find the value for, given a data log of the corresponding type. After executing the particular parser on the unlabeled data log, if the parsing engine was not able to extract the expected information, then the parsing engine can generate an alert to this effect. In response to the alert, a log type mapping engine of the data analysis system can identify the log type having the second highest probability of success. The log type mapping engine can identify a parser corresponding to the log type and send the parser to the parsing engine. The parsing engine can then execute the parser corresponding to the possible log type having the second highest probability on the unlabeled data log. The data analysis system can continue trying the next highest log type and parser combination until one successfully parses the data log.

If the data analysis system determines that the parser corresponding to the possible log type having the second highest probability successfully parsed the unlabeled computer security data log, then the data analysis system can use this information to improve future predictions made by the machine learning model.

The data analysis system can generate training data that includes the unlabeled data log and a label that identifies the possible log type having the second highest probability. The data analysis system can then train the machine learning model using the training data to predict the unlabeled data log is of the possible log type having the second highest probability. Generating and using the training data allows the data analysis system to improve or fine-tune the performance of the machine learning model. Training the machine learning model is discussed in greater detail below with respect to FIG. 3.

Figure 3:
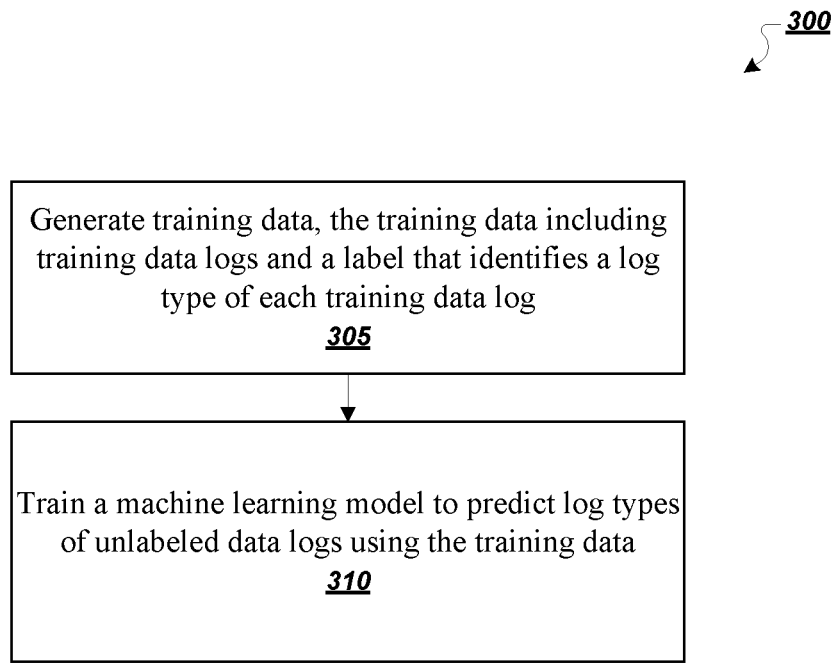
FIG. 3 is a flowchart of an example process for training a machine learning model to predict data log types of unlabeled data logs.

FIG. 3 is a flowchart of an example process for training a machine learning model to predict log types of unlabeled data logs. For convenience, the process 300 will be described as being performed by a system of one or more computers, located in one or more locations, and programmed appropriately in accordance with this specification. For example, a computer network security data analysis system, e.g., the data analysis system 100 of FIG. 1, appropriately programmed, can perform the process 300.

The data analysis system generates training data, the training data including training data logs and, for each training data log, a label that identifies a log type of the training data log (305). For example, the data analysis system can choose a training data log and a label for the training data log, based on the results of successful parses, i.e., when the combination of log type and parser successfully parses a data log.

The data analysis system trains a machine learning model to predict log types of unlabeled data logs using the training data (310). That is, the system can perform multiple iterations of a training technique to configure the machine learning model to output a probability distribution over a subset of a set of data log types that likely correspond to a given data log.

In some implementations, in addition to including a label that identifies a log type for the training data log, the training data also includes a label that identifies one or more log subtypes of the training data log. The system can use log subtypes to ensure that the diversity of certain logs is considered. In general, a log subtype is a data log of a given type that has a particular property, e.g., that reports on a particular type of network event, that has a field that is a certain value, or that is encoded in particular format. The system can sort the data logs belonging to a given log type into subtypes and then generate training data by sampling from all of the subtypes to make sure that the training data includes each subtype. Accordingly, the system trains the machine learning model using the training data to account for even rarely occurring subtypes.

A particular property of a data log can be the type of network activity that the data log reports. For example, an endpoint detection and response (EDR) log may report on activity such as network connections, process starts/stops, and file modifications, among other types of activity. The distribution of these types of activity may not be uniform. For example, a first type of activity may be reported often, while a second type of activity may be reported rarely. Because of the skew in reported types of activity, a random sampling of training data may not be diverse enough to account for rarely reported types. Therefore, the system can further organize log subtype by the type of activity that the data log reports on to ensure that the training data for a given log type includes sufficient data logs that belong to each log subtype.

In some implementations, the system identifies log subtypes from an "eventtype" field in a JSON log file. In other implementations, the system identifies log subtypes using fields like DNS query type or response code in a DNS log.

A particular property can be a field of a data log that has a certain value. For example, all data logs of a particular type may include a field called "DNS lookup". While most data logs of the particular type may have the value of the DNS lookup field set to "successful", in certain rare situations, the value of the DNS lookup field may be set to "unsuccessful". It may be advantageous for the data analysis system 100 to organize data logs that include the DNS lookup field into the particular type, while further organizing these data logs by successful and unsuccessful lookups. Accordingly, the particular log type can be further organized into two subtypes: a first for successful lookups and a second for unsuccessful lookups.

A particular property could be that the data log is encoded in a particular format. For example, a single log type can be encoded using multiple different formats, e.g., the log type "Windows SysMon" can be encoded in XML or JSON. The log type can be WINDOWS_SYSMON, while the log subtypes can further identify whether the data log is encoded in XML or JSON.

In some implementations the data analysis system receives labeled training data. For each training data log of the labeled training data, the data analysis system can determine a first log type for the training data log. For example, the data analysis system can determine the first log type using a corresponding label for the training data log. The data analysis system can then determine a parser that corresponds to the first log type. For example, the data analysis system can use a mapping from each of a plurality of log types to a parser corresponding to the log type. The data analysis system can use the parser to parse the training data log. If the data analysis system determines that the parser successfully parsed the training data log, then the system can add the training data log and the first log type to the training data. This ensures that the system does not add incorrectly labeled data logs to the training data. The data analysis system can use the training data, including the training data log and the first log type, to train the machine learning model.

In other implementations, the data analysis system receives unlabeled training data and determines a log type for the unlabeled training data using a brute force approach. For each training data log of the unlabeled training data, the data analysis system can parse the training data log using parsers from a set of parsers, e.g., those present in a parser database, until a particular parser successfully parses the training data log. Each parser with which the data analysis system attempts to parse the training data log corresponds to a different log type. The data analysis system then determines a particular log type that corresponds to the particular parser and adds the training data log and the particular log type to the training data, which can be used to train the machine learning model.

As used in this specification, the term "engine" or "software engine" refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Other embodiments are in the following claims.

What is claimed is:

1. A method performed by one or more computers, the method comprising:
    generating training data, the training data comprising a plurality of training computer security data logs and, for each training computer security data log, a label that identifies a log type of the training computer security data log, wherein each log type is mapped to a corresponding parser that is configured to part a security data log of the log type to which it corresponds; and
    training a machine learning model to predict log types of unlabeled computer security data logs using the training data, wherein the machine learning model is a neural network;
    obtaining an unlabeled computer security data log;
    processing the unlabeled computer security data log using the machine learning model after training the machine learning model to generate a probability distribution that includes a respective probability for each of a plurality of possible log types, wherein each of the plurality of possible log types is associated with a corresponding parser that parses logs of the possible log type to extract structured computer security data, and wherein the machine learning model does not parse the unlabeled computer security data specifically for each corresponding parser to determine the respective probabilities;
    selecting the possible log type having the highest probability; and
    parsing the unlabeled computer security data log using the parser corresponding to the selected possible log type.

2. The method of claim 1 further comprising maintaining a mapping from each of a plurality of log types to a parser corresponding to the log type, wherein one or more of the plurality of log types includes a plurality of log subtypes.

3. The method of claim 1, further comprising:
    determining that the parser corresponding to the selected possible log type did not successfully parse the unlabeled computer security data log; and
    in response, parsing the unlabeled computer security data log using the parser corresponding to the possible log type having the second highest probability.

4. The method of claim 3 further comprising:
    determining that the parser corresponding to the possible log type having the second highest probability successfully parsed the unlabeled computer security data log;
    generating updated training data, the updated training data comprising the unlabeled computer security data log and a label that identifies the possible log type having the second highest probability; and
    retraining the machine learning model using the updated training data to predict the unlabeled computer security data log is of the possible log type having the second highest probability.

5. The method of claim 1, wherein generation the training data comprises:
    receiving labeled training data;
    for each training computer security data log of the labeled training data:
        determining a first log type for the training computer security data log using a corresponding label for the training computer security data log;
        determining, using a mapping from each of a plurality of log types to a parser corresponding to the log type, a parser that corresponds to the first log type;
        parsing the training computer security data log using the parser that corresponds to the first log type;
        determining that the parser successfully parsed the training computer security data log; and
        in response to determining that the parser successfully parsed the training computer security data log, adding the training computer security data log and the first log type to the training data.

6. The method of claim 1 further comprising:
    receiving unlabeled training data;
    for each training computer security data log of the unlabeled training data:
        parsing the training computer security data log of the unlabeled training data using parsers selected from a plurality of parsers until a particular parser successfully parses the training computer security data log of the unlabeled training data, wherein each parser of the plurality of parsers corresponds to a different log type;
        determining a particular log type corresponding to the particular parser; and
        adding the training computer security data log and the particular log type to the training data.

7. The method of claim 1, wherein a parser that successfully parses a computer security data log labeled with a first type and a first subtype also successfully parses a computer security data log labeled with the first type and a second subtype.

8. The method of claim 7, wherein a first log type comprises a plurality of log subtypes.

9. A system comprising one or more computers and one or more storage devices storing instructions that when executed by the one or more computers cause the one or more computers to perform operations comprising:
    generating training data, the training data comprising a plurality of training computer security data logs and, for each training computer security data log, a label that identifies a log type of the training computer security data log, wherein each log type is mapped to a corresponding parser that is configured to part a security data log of the log type to which it corresponds; and
    training a machine learning model to predict log types of unlabeled computer security data logs using the training data, wherein the machine learning model is a neural network;
    obtaining an unlabeled computer security data log;
    processing the unlabeled computer security data log using the machine learning model after training the machine learning model to generate a probability distribution that includes a respective probability for each of a plurality of possible log types, wherein each of the plurality of possible log types is associated with a corresponding parser that parses logs of the possible log type to extract structured computer security data, and wherein the machine learning model does not parse the unlabeled computer security data specifically for each corresponding parser to determine the respective probabilities;

selecting the possible log type having the highest probability; and parsing the unlabeled computer security data log using the parser corresponding to the selected possible log type.

10. The system of claim 9, wherein the operations further comprise maintaining a mapping from each of a plurality of log types to a parser corresponding to the log type, wherein one or more of the plurality of log types includes a plurality of log subtypes.

11. The system of claim 9, wherein the operations further comprise:

determining that the parser corresponding to the selected possible log type did not successfully parse the unlabeled computer security data log; and in response, parsing the unlabeled computer security data log using the parser corresponding to the possible log type having the second highest probability.

12. The system of claim 11, wherein the operations further comprise:

determining that the parser corresponding to the possible log type having the second highest probability successfully parsed the unlabeled computer security data log;

generating updated training data, the updated training data comprising the unlabeled computer security data log and a label that identifies the possible log type having the second highest probability; and retraining the machine learning model using the updated training data to predict the unlabeled computer security data log is of the possible log type having the second highest probability.

13. The system of claim 9, wherein the generation of training data comprises receiving labeled training data;

for each training computer security data log of the labeled training data:

determining a first log type for the training computer security data log using a corresponding label for the training computer security data log;

determining, using a mapping from each of a plurality of log types to a parser corresponding to the log type, a parser that corresponds to the first log type;

parsing the training computer security data log using the parser that corresponds to the first log type;

determining that the parser successfully parsed the training computer security data log; and in response to determining that the parser successfully parsed the training computer security data log, adding the training computer security data log and the first log type to the training data.

14. The system of claim 9, wherein the operations further comprise:

receiving unlabeled training data;

for each training computer security data log of the unlabeled training data:

parsing the training computer security data log of the unlabeled training data using parsers selected from a plurality of parsers until a particular parser successfully parses the training computer security data log of the unlabeled training data, wherein each parser of the plurality of parsers corresponds to a different log type;

determining a particular log type corresponding to the particular parser; and adding the training computer security data log and the particular log type to the training data.

15. The system of claim 9, wherein the training data further comprises a label that identifies a log subtype of the training computer security data log.

16. The system of claim 15, wherein a parser that successfully parses a computer security data log labeled with a first type and a first subtype also successfully parses a computer security data log labeled with the first type and a second subtype.

17. The system of claim 16, wherein a first log type comprises a plurality of log subtypes.

* * * * *